(12) United States Patent
Motonami et al.

(10) Patent No.: US 11,130,896 B2
(45) Date of Patent: Sep. 28, 2021

(54) HEAT-STORAGE MATERIAL AND REFRIGERATOR AND COOLING CONTAINER THAT INCLUDE THE HEAT-STORAGE MATERIAL

(71) Applicant: SHARP KABUSHIKI KAISHA, Sakai (JP)

(72) Inventors: Satoru Motonami, Sakai (JP); Yuka Utsumi, Sakai (JP); Masao Urayama, Sakai (JP); Hisanori Bessho, Sakai (JP); Daiji Sawada, Sakai (JP); Takashi Yamashita, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 109 days.

(21) Appl. No.: 16/065,450

(22) PCT Filed: Dec. 19, 2016

(86) PCT No.: PCT/JP2016/087788
§ 371 (c)(1),
(2) Date: Jun. 22, 2018

(87) PCT Pub. No.: WO2017/110742
PCT Pub. Date: Jun. 29, 2017

(65) Prior Publication Data
US 2019/0002748 A1     Jan. 3, 2019

(30) Foreign Application Priority Data

Dec. 25, 2015 (JP) .............................. JP2015-254694

(51) Int. Cl.
*C09K 5/06* (2006.01)
*F25D 3/00* (2006.01)
(Continued)

(52) U.S. Cl.
CPC .............. *C09K 5/066* (2013.01); *F25D 3/00* (2013.01); *F25D 11/006* (2013.01); *F25D 16/00* (2013.01);
(Continued)

(58) Field of Classification Search
CPC ....... C09K 5/066; F25D 11/006; F25D 16/00; F25D 3/00; F28D 20/02; F28D 20/021;
(Continued)

(56) References Cited

U.S. PATENT DOCUMENTS 3,720,198 A * 3/1973 Laing ...................... C09K 5/06
126/400
3,834,456 A * 9/1974 Clarke .................. C09K 5/063
165/104.17

(Continued)

FOREIGN PATENT DOCUMENTS

JP    2007-186667 A    7/2007
JP    2008-214482 A    9/2008
JP    2008-214527 A    9/2008

OTHER PUBLICATIONS https://chem.libretexts.org/Bookshelves/General_Chemistry/Book%3A_ChemPRIME_(Moore_et al.)/11%3A_Reactions_in_Aqueous_Solutions/11,04%3A_Hydration_of_Ions (Year: 2020).*

*Primary Examiner* — Len Tran
*Assistant Examiner* — Kirstin U Oswald
(74) *Attorney, Agent, or Firm* — ScienBiziP, P.C.

(57) ABSTRACT

A heat-storage material that provides a sufficiently large amount of thermal energy as a latent-heat storage material including a semiclathrate hydrate and that improves hysteresis between the solidifying temperature and the melting starting temperature and a refrigerator and a cooling container that include the heat-storage material are provided. The heat-storage material that changes phase at a predetermined temperature includes water, a main agent including a (Continued)

quaternary ammonium salt that forms a semiclathrate hydrate, a pH adjuster that maintains alkaline properties, and a nucleating agent that generates a cation that exhibits positive hydration. In such an aqueous solution maintained to be alkaline, the nucleating agent becomes a nucleus in solidification, and thus, the temperature difference between the solidifying temperature and the melting temperature can be decreased.

5 Claims, 4 Drawing Sheets

(51) Int. Cl.
    *F28D 20/02*      (2006.01)
    *F25D 16/00*      (2006.01)
    *F25D 11/00*      (2006.01)

(52) U.S. Cl.
    CPC ........... *F28D 20/02* (2013.01); *F28D 20/021* (2013.01); *Y02E 60/14* (2013.01); *Y02E 70/30* (2013.01)

(58) Field of Classification Search
    CPC ..... Y02E 70/30; Y02E 60/147; Y02E 60/145; Y02E 60/14
    USPC ........................................................ 62/457.2
    See application file for complete search history.

(56) References Cited

U.S. PATENT DOCUMENTS

| | | | | |
|---|---|---|---|---|
| 3,951,127 | A * | 4/1976 | Watson | F28D 20/028 126/206 |
| 4,003,426 | A * | 1/1977 | Best | C09K 5/063 165/53 |
| 4,117,882 | A * | 10/1978 | Shurcliff | F28D 20/02 126/642 |
| 4,152,899 | A * | 5/1979 | Herrick | F28D 20/02 62/4 |
| 4,180,124 | A * | 12/1979 | Shurcliff | F28D 20/02 165/86 |
| 4,192,144 | A * | 3/1980 | Pierce | F28D 20/023 60/641.8 |
| 4,205,656 | A * | 6/1980 | Scarlata | F28D 20/02 126/400 |
| 4,219,072 | A * | 8/1980 | Barlow, Sr. | F28D 20/023 165/276 |
| 4,223,721 | A * | 9/1980 | Schoenfelder | F28D 20/02 165/104.17 |
| 4,248,291 | A * | 2/1981 | Jarmul | F28D 20/02 165/4 |
| 4,391,267 | A * | 7/1983 | Arrhenius | C09K 5/063 126/400 |
| 4,503,838 | A * | 3/1985 | Arrhenius | C09K 5/063 126/263.03 |
| 4,696,338 | A * | 9/1987 | Jensen | F28D 20/025 165/104.17 |
| 4,793,402 | A * | 12/1988 | Yano | F28D 20/023 165/10 |
| 5,553,662 | A * | 9/1996 | Longardner | F24F 5/0017 165/202 |
| 5,709,945 | A * | 1/1998 | Lee | C09K 5/06 428/403 |
| 5,943,876 | A * | 8/1999 | Meyer | F28D 20/02 62/371 |
| 6,028,066 | A * | 2/2000 | Unger | A61K 47/544 514/180 |
| 6,123,923 | A * | 9/2000 | Unger | A61K 49/0002 424/450 |
| 6,484,514 | B1 * | 11/2002 | Joseph | B65D 81/3266 62/4 |
| 7,040,115 | B1 * | 5/2006 | Lopez | C09K 5/063 564/281 |
| 7,875,749 | B2 * | 1/2011 | Tomura | C09K 5/063 564/281 |
| 7,967,999 | B2 * | 6/2011 | Tomura | C09K 5/063 252/70 |
| 8,037,696 | B2 * | 10/2011 | Shaham | A01N 1/02 62/62 |
| 2001/0018072 | A1 * | 8/2001 | Unger | B82Y 5/00 424/484 |
| 2001/0031243 | A1 * | 10/2001 | Unger | A61K 49/227 424/9.51 |
| 2002/0159951 | A1 * | 10/2002 | Unger | A61K 49/223 424/9.51 |
| 2005/0019266 | A1 * | 1/2005 | Unger | A61K 49/227 424/9.321 |
| 2010/0001228 | A1 | 1/2010 | Tomura et al. | |
| 2010/0004487 | A1 | 1/2010 | Tomura et al. | |
| 2010/0133464 | A1 * | 6/2010 | Tomura | F28D 20/02 165/104.14 |
| 2010/0327217 | A1 * | 12/2010 | Tomura | C09K 5/063 252/70 |
| 2011/0083827 | A1 * | 4/2011 | Salyer | F28D 20/02 165/104.14 |
| 2012/0048768 | A1 * | 3/2012 | Holloway | F28D 20/021 206/524.1 |
| 2014/0060794 | A1 * | 3/2014 | Ishii | B60H 1/143 165/201 |
| 2014/0102662 | A1 * | 4/2014 | Grama | F28D 20/0034 165/10 |
| 2015/0285566 | A1 * | 10/2015 | Machida | F28D 20/028 165/10 |
| 2016/0102232 | A1 * | 4/2016 | Bissell | C09K 5/063 252/76 |
| 2016/0370084 | A1 * | 12/2016 | Bessho | C09K 5/063 |

\* cited by examiner

HEAT-STORAGE MATERIAL AND REFRIGERATOR AND COOLING CONTAINER THAT INCLUDE THE HEAT-STORAGE MATERIAL

TECHNICAL FIELD

The present invention relates to a heat-storage material that changes phase at a predetermined temperature and to a refrigerator and a cooling container that include the heat-storage material.

BACKGROUND ART

Clathrate hydrates, particularly semiclathrate hydrates, are crystalized by cooling an aqueous solution serving as the main agent thereof at or below a hydrate-generating temperature. Thermal energy is stored in the crystal as latent heat, and thus, semiclathrate hydrates have been conventionally used as latent-heat storage materials or as components of the latent-heat storage materials.

In particular, quaternary ammonium salt hydrates, which are typical examples of semiclathrate hydrates including a non-gaseous substance as a guest compound thereof, are generated under atmospheric pressure, have a high thermal energy (amount of heat storage) in crystallization, and are non-flammable, which is different from paraffin. Therefore, quaternary ammonium salt hydrates are easy to handle and nave thus been focused on as replacement means for ice heat-storage tanks used to air-condition buildings.

Among such compounds, latent heat thermal energy of semiclathrate hydrates that include tetra-n-butylammonium bromide or tri-n-butyl-n-pentylammonium bromide as a guest compound thereof can be obtained at a temperature higher than a temperature at which latent heat thermal energy of ice can be obtained. Thus, semiclathrate hydrates have been used extensively in heat-storage tanks and heat transport media that are more effective than ice heat-storage tanks.

However, the temperature at which semiclathrate hydrates are generated, in other words, the solidifying temperature at which semiclathrate hydrates crystalize from the liquid phase to the solid phase is significantly influenced by the supercooling phenomenon of water. Therefore, the difference between the solidifying temperature and the melting temperature at which thermal energy is obtained as latent heat is significantly high, and thus semiclathrate hydrates may be difficult to handle in some respects. PTL 1 discloses means for increasing the heat storage rate by adding an alkali metal phosphate to an aqueous solution of a heat-storage agent including a clathrate hydrate that includes a quaternary ammonium salt as a guest compound thereof.

In PTL 1, either the amount of thermal energy that a unit volume or unit weight of a heat-storage agent can store in a unit time by a heat exchange operation under a certain condition or a parameter having a positive correlation with such an amount of the thermal energy is defined as the "heat storage rate". PTL 1 describes means for increasing the heat storage rate or suppressing the supercooling phenomenon by adding an alkali metal phosphate to an aqueous solution of a heat-storage agent including a clathrate hydrate that includes a quaternary ammonium salt as a guest compound thereof.

CITATION LIST

Patent Literature

PTL 1: Japanese Unexamined Patent Application Publication No. 2008-214527

SUMMARY OF INVENTION

Technical Problem

However, the "heat-storage agent including a clathrate hydrate" described in PTL 1 clearly refers to solid particles of the primary hydrate of a clathrate hydrate including tetra-n-butylammonium bromide as a guest thereof that are in a state of being dispersed or suspended, in other words, to the "slurry" defined in PTL 1. Therefore, the amount of heat of the heat-storage agent, which is obtained by the disclosed technique, is only 29 to 46 J per 1 g of an aqueous solution.

This amount of heat corresponds to that of temperature difference between 7° C. and 11° C. in 1 g cold water in a large tank used for water heat storage in, for example, an air-conditioning system and seems relatively large. However, when the heat-storage agent is seen as a typical latent-heat storage material, the amount of latent heat of the heat-storage agent is less than that of paraffin (tetradecan), which is 200 J/g, paraffin being a latent-heat storage material in the same temperature range. Heat-storage materials have advantages of transferring thermal energy over time and over a space; however, the heat-storage agent has less latent heat, and thus, it is difficult to use the heat-storage agent in an application in which the thermal energy is transferred over a space (e.g., cooling in transportation or icing after exercise). In addition, in an application in which the heat-storage agent is used in a relatively small volume (e.g., for cooling a refrigerator during a power outage or for applying icing to people), the heat-storage agent provides low thermal energy relative to the volume thereof in use, and thus, it is not practical to use the heat-storage agent.

Therefore, there has been a demand for a heat-storage material that is non-flammable, able to solidify at at least 0° C. or higher, and has a relatively small temperature difference between the solidifying temperature and the melting temperature and is thus easy to handle, has a latent heat as large as that of paraffin, and can be used in a small volume in daily life.

From the thermodynamics knowledge, it is possible to think of the use of a nucleating agent that generates nuclei as an additive to suppress the supercooling phenomenon. Examples of such a nucleating agent include mineral materials that are present as solids in a liquid phase when added and will thus become nuclei of crystals and materials that crystalize more rapidly than a main material in cooling, specifically materials that have a high crystallization temperature (or melting point) and materials that are deposited at about the crystallization temperature due to the temperature dependence of saturation solubility.

Desired effects of a nucleating agent will be described in a case where the liquid phase is water and the solid phase is ice. When ice crystals are formed from water, boundary surfaces are formed between water and ice. Molecules at the boundary surfaces are in a state in which intermolecular forces of water and ice greatly differ from each other. To cause ice to grow, water molecules need to be separated from other water molecules. It is impossible to grow ice without supplying surface energy.

If ice nuclei initially generated are small, the area of the boundary surfaces between water and ice is large relative to the number of molecules that solidify. Thus, the surface energy is insufficient, and ice reverts to water. A state in which the surface energy barrier is not sufficiently decreased is referred to as a metastable state in thermodynamics, and this causes the supercooling phenomenon. When temperature is decreased such that the surroundings of ice nuclei draw sufficient heat, surface energy is supplied, and crystallization starts. In other words, a nucleating agent includes a material that can be a nucleus large enough to ignore the increase in the surface energy.

However, the above description is just a qualitative concept. Universal law or scientific knowledge for suppressing supercooling remains unclear. Therefore, which additives are appropriate and the extent to which the additives have effects in an intended system, have been studied by a trial-and-error approach.

The present invention has been conducted in the foregoing, and an object of the present invention is to provide a heat-storage material that provides a sufficiently large amount of thermal energy as a latent-heat storage material including a semiclathrate hydrate and that improves hysteresis between the solidifying temperature and the melting starting temperature and a refrigerator and a cooling container that include the heat-storage material.

Solution to Problem

The inventors have conducted extensive studies and found that the following composition achieves the object: a composition of a heat-storage material that includes a main heat-storage agent, which is a semiclathrate hydrate including a quaternary ammonium salt as a guest compound thereof, and additives, which are normal and acid salts containing a cation, the aqueous solution of the salts being alkaline, and the cation exhibiting positive hydration.

To achieve the above object, a heat-storage material according to one aspect of the present invention is a heat-storage material that changes phase at a predetermined temperature and includes water, a main agent including a quaternary ammonium salt that forms semiclathrate hydrate, a pH adjuster that maintains alkaline properties, and a nucleating agent that generates a cation that exhibits positive hydration.

In this way, a cation that exhibits positive hydration and that is generated in an aqueous solution maintained to be alkaline becomes a nucleus in solidification, and thus, the temperature difference between the solidifying temperature and the melting temperature can be decreased. Not only a tetragonal semiclathrate hydrate, but also an orthorhombic semiclathrate hydrate can be reliably generated and solidify at 0° C. or higher. The main agent used forms a semiclathrate hydrate, and thus, a large amount of latent heat energy can be used.

Advantageous Effects of Invention

According to one aspect of the present invention, addition of the cation that exhibits positive hydration facilitates water structure formation, thereby realizing an effect of decreasing the surface energy barrier. The addition of the cation increases the solidifying temperature, thereby improving hysteresis between the solidifying temperature and the melting temperature, in other words, avoiding the supercooling phenomenon. Furthermore, a semiclathrate hydrate including tetra-n-butyl ammonium bromide as a guest compound thereof includes a primary hydrate and a secondary hydrate that are different from each other in terms of the number of hydrates. Thus, the frozen state in which the semiclathrate hydrate is in an almost perfect solid phase can be obtained at a solidifying temperature, that is, at or above the freezing point, and thus, a large amount of thermal energy can be used.

DESCRIPTION OF EMBODIMENTS

Figure 1:
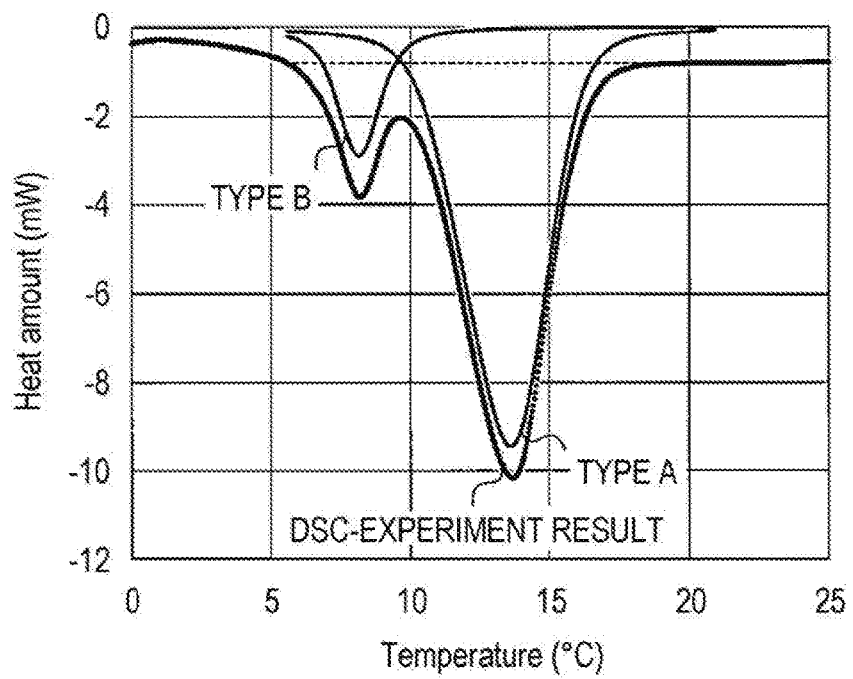
FIG. 1 is a graph showing a DSC-experiment result of a heat-storage material according to one aspect of the present invention.

Hereinafter, the definitions of terms in the present invention will be described. The terms are to be construed in accordance with the following definitions, unless otherwise specified.

(1) The terms "clathrate hydrate" and "semiclathrate hydrate" are not strictly distinguished from each other in terms of definition. Each term refers to a hydrate including a non-gaseous substance as a guest (guest compound) thereof in one aspect of the present invention.

(2) The terms "heat-storage material" and "cold-storage material" are not clearly distinguished from each other. A material having a melting point of 20° C. or lower, 20° C. being a reference condition, may be referred to as a "cold-storage material", and a material having a melting point of 20° C. or higher may be referred to as a "heat-storage material".

(3) A heat-storage material and a cold-storage material are compositions in a practical implementation according to one aspect of the present invention, and each includes a main heat (cold)-storage agent, an alkaline agent, and a nucleating agent according to one aspect of the present invention.

(4) The term "main heat (cold)-storage agent" refers to a composition of water and a guest compound that forms a semiclathrate hydrate (corresponding to (1) above) including a non-gaseous substance as a guest thereof. The main heat (cold)-storage agent may be in a solid phase, a liquid phase, or in a phase change state.

(5) The terms "solidifying temperature" and "freezing temperature" each refer to a temperature at which a liquid phase turns into a solid phase. According to one aspect of the present invention, such a temperature corresponds to a value measured by disposing a plastic bottle containing 50 ml of a heat-storage material in a cooling box (such as a refrigerator, a freezer, or a programmable constant temperature chamber) and performing measurement with a thermocouple with decreasing the temperature in the cooling box. It is known that the occurrence of the supercooling phenomenon depends on the volume; however, the inventors have confirmed in experiments that the influence of volume is subtle when the volume of the heat-storage material is 50 ml or more.

(6) The term "melting starting temperature" refers to a temperature obtained by extrapolating to the baseline the temperature at which a heat generation peak starts in a DSC curve obtained by differential scanning calorimetry (DSC).

(7) The terms "frozen state" and "solidified state" each refer to a state in which a solid phase occupies 95% or more of the total volume and in which a liquid phase present in a tiny amount is separated from the solid phase. The terms do not include a state in which solid particles are suspended or dispersed in a liquid.

(8) The term "amount of latent heat" refers to a value determined from the area of a heat generation peak in a DSC curve obtained by differential scanning calorimetry (DSC) and is described as an amount of heat per weight or per volume of a heat-storage material.

(9) The terms "positive hydration", "hydrophobic hydration", and "structure-forming hydration" each refer to a state in which water molecules in the surroundings of a cation are less likely to move than bulk water molecules because the water molecules in the surroundings of a cation are strongly attracted to the ion and form a highly ordered structure. Clathrate hydrates correspond to hydrophobic hydration in a broad sense.

(10) The term "negative hydration", "hydrophilic hydration", or "structure-destroying hydration" each refer to a state in which water molecules in the surroundings of a cation are more likely to move than bulk water molecules because water molecules in the surroundings of a cation are attracted to the cation not as strongly as in positive hydration, but strongly enough to be separated from a hydrogen-bond network of bulk water molecules.

Next, embodiments of the present invention will be described with reference to the drawings.

First Embodiment (Composition of Heat-Storage Material)

A heat-storage material according to one aspect of the present invention is a latent-heat storage material that changes phase at a predetermined temperature and includes water, a main agent, a pH adjuster, and a nucleating agent. The main agent includes a quaternary ammonium salt and forms a semiclathrate hydrate. In this way, the main agent used forms a semiclathrate hydrate, and thus, a large amount of latent heat energy can be used. The main agent is preferably tetrabutylammonium bromide (TBAB). In this case, from the viewpoint of the oral toxicity of TBAB, TBAB preferably has a concentration of 32 wt % or lower relative to water.

The pH adjuster is, for example, sodium carbonate and maintains the alkaline properties of the aqueous solution. The heat-storage material preferably has a pH of 10 or more. This reliably keeps the solution alkaline and enables generation of a cation that exhibits positive hydration. The content of the pH adjuster is preferably 1.4 to 2.4 wt %. Sodium carbonate is not a deleterious or dangerous substance and is thus easier to handle than sodium hydroxide.

The nucleating agent is, for example, disodium hydrogen phosphate dihydrate, disodium hydrogen phosphate heptahydrate, or disodium hydrogen phosphate dodecahydrate and generates a cation that exhibits positive hydration in the aqueous solution. In the above composition, a cation that exhibits positive hydration generated in the aqueous solution maintained to be alkaline becomes a nucleus in solidification. As a result, the solidifying temperature increases, thereby decreasing the temperature difference between the solidifying temperature and the melting temperature. Not only a tetragonal semiclathrate hydrate (type A, which will be described later), but also an orthorhombic semiclathrate hydrate (type B, which will be described later) can reliably be generated and solidify at 0° C. or higher.

The nucleating agent is preferably a hydrate or anhydrate of disodium hydrogen phosphate and further preferably disodium hydrogen phosphate dodecahydrate. When sodium carbonate and a hydrate or anhydrate of disodium hydrogen phosphate are both included in the aqueous solution, the heat-storage material can stably solidify. The content of the nucleating agent is preferably 1.0 to 2.9 wt %. This improves the effect of preventing supercooling.

(Method for Producing Heat-Storage Material)

The heat-storage material can be produced by mixing water, a main agent (for example, TBAB), a pH adjuster (e.g., sodium carbonate), and a nucleating agent (e.g., disodium hydrogen phosphate dodecahydrate) at room temperature. In mixing, each of the components of the material is weighed so that the content thereof becomes an appropriate value and mixed with other components. For example, relative to the total, the content of the main agent is set to be 29 to 33 wt %, the content of the pH adjuster is set to at least 0.1 wt %, the content of the nucleating agent is set to at least 1.4 wt %, and the total content of the adjuster and the nucleating agent is set to at least 2.1 wt %. With increasing contents of the pH adjuster and the nucleating agent, the amount of the main agent decreases in relative terms, thereby decreasing the amount of latent heat to be obtained. From the viewpoint of ensuring a sufficient amount of latent heat, the total content is practically not over 10 wt % and preferably 6 wt % or less.

(Clathrate Hydrate)

As typical examples of crystal structures of a clathrate hydrate, polyhedra (cage or basket) formed by hydrogen bonds of water molecules such as dodecahedra, tetrakaidecahedra, and hexakaidecahedra are known. Water molecules are hydrogen bonded to each other to form a cavity and also hydrogen bonded to water molecules forming another cavity, thereby forming a polyhedron. Clathrate hydrates are known to have crystal types that are referred to as structure I and structure II.

Regarding the unit cell of each crystal type, the unit cell of structure I is formed of 46 water molecules, six large cavities (tetrakaidecahedra each formed of 12 five-membered rings and two six-membered rings) and two small cavities (tetrakaidecahedra each formed of five-membered rings), and the unit cell of structure II is formed of 136 water molecules, eight large cavities (hexakaidecahedra each formed of 12 five-membered rings and four six-membered rings) and 16 small cavities (tetrakaidecahedra each formed of five-membered rings). Regarding clathrate hydrates including a gas as a guest compound thereof, crystal structures formed with these unit cells are generally of a cubic type.

On the other hand, when a clathrate hydrate includes, as a guest compound thereof, a large molecule of a non-gaseous substance, such as a quaternary ammonium salt used in one aspect of the present invention, hydrogen bonds forming a cage are partly broken, and thus, dangling bonds are included. A semiclathrate hydrate including tetra-n-butylammonium bromide as a guest compound thereof has two types of crystal structures: type A (the same as the primary hydrate in PTL 1) is tetragonal and type B (the same as the secondary hydrate in PTL 1) is orthorhombic.

An orthorhombic unit cell of type B includes six dodecahedral, four tetrakaideciahedral, and four pentakaidecahedral cages and includes two molecules of tetra-n-butylammonium bromide as guest compounds thereof. Bromine atoms are integrated in the cage structure and bonded to water molecules. Tetra-n-butylammonium ions (cations) are included in the center of the four cages, which are two tetrakaidekahedral and two pentakaidecahedral cages having some dangling bonds. The six dodecahedral cages are hollow. The unit cell of type A is also formed by a combination of dodecahedra, tetrakaidecahedra, and pentakaidecahedra, and the dodecahedra are hollow.

The two types will be described by using hydration numbers (molar ratios) of tetra-n-butylammonium bromide and water. In type A, the average hydration number of water molecules is about 26 (molar ratio 1:26), and in type B, the average hydration number is about 36 (molar ratio 1:36). The concentration of tetra-n-butylammonium bromide in this case is referred to as the congruent melting point composition. The congruent melting point composition of type A is about 40 wt % and that of type B is about 32 wt %.

In a process of cooling a semiclathrate hydrate including tetrabutylammonium bromide as a guest compound thereof, type A is initially generated. Even if the concentration is low, type A is generated by encompassing the guest compound, and water in an amount of equal to or more than a molar ratio of 36 is referred to as excess water (if cooling is performed to or below the temperature at which water freezes, water turns into ice and into a frozen state). When the concentration is sufficiently low and is, for example, 20 wt % or lower, the state in which type A is suspended in water is a so-called slurry state.

This indicates that even if the content in a semiclathrate hydrate is 32 wt %, which is the congruent melting point composition of type B, when type A is predominantly generated by cooling, the composition includes mostly type A, a tiny amount of type B, and excess water. Excess water is less likely to be observed when freezing is performed under a circumstance at a temperature below the freezing point. This is because water turns into ice.

A large amount of excess water is not preferable because heat conductivity of the water and heat diffusion caused by convection promote melting. Type A has a melting starting temperature of 10° C., and type B has a melting starting temperature of 6° C. Thus, it is extremely difficult to suppress predominant generation of type A having a higher temperature that is the melting point thereof.

According to one aspect of the present invention, not only type A, but also type B can be reliably generated. As a result, even if freezing is performed at or above the freezing point, the amount of excess water is 5 wt % or less of the total, thereby reducing a problem of promoting melting and solving a practical problem. The inventors have found that an alkaline agent for making an aqueous solution alkaline such that the aqueous solution has a hydrogen ion concentration of at least pH 10 and a nucleating agent having a solubility that decreases at 10° C. or less, preferably at about 5° C., are effective additives for generating type B. The inventors nave also found that salts including a cation exhibiting positive hydration are suitable for the alkaline agent and the nucleating agent. The cations exhibiting positive hydration suppress motion of water molecules and cause water molecules to be in a so-called motionless state. It is assumed that this is effective for generating type B, in other words, a structure having a large hydration number.

FIG. 1 is a graph showing a DSC-experiment result. Two peaks are observed in each of Examples 1 to 9 in the DSC experiment described later as shown in FIG. 1. The peak in a lower temperature region is derived from type B and the peak in a higher temperature region is derived from type A. In the present invention, latent heat is defined as the area of a portion surrounded by dots and the dashed line. When the waves are separated, the ratio of type B to type A is about 1:4.

EXAMPLES

[Production of Heat-Storage Material (Examples and Comparative Examples)]

The following heat-storage materials were produced.

EXAMPLE 1

The main agent of a heat-storage material is tetrabutylammonium bromide (hereinafter, abbreviated as TBAB). TBAB in an amount of 31 weight % (wt %), sodium carbonate serving as a pH adjuster in an amount of 1.9 wt %, and disodium hydrogen phosphate dodecahydrate serving as a nucleating agent in an amount of 2.9 wt % were mixed with each other to produce an aqueous solution, which served as the heat-storage material. The heat-storage-material aqueous solution has a pH of 10.7, a melting starting temperature of 6.2° C., which was determined by the DSC measurement, and an amount of latent heat of 162 J/g, which was determined by the DSC measurement.

EXAMPLE 2

The main agent of a heat-storage material is TBAB. TBAB in an amount of 31 wt %, sodium carbonate serving as a pH adjuster in an amount of 1.9 wt %, and disodium hydrogen phosphate dodecahydrate serving as a nucleating agent in an amount of 1.4 wt % were mixed with each other to produce an aqueous solution, which served as the heat-storage material. The heat-storage-material aqueous solution has a pH of 10.8, a melting starting temperature of 6.2° C., which was determined by the DSC measurement, and an amount of latent heat of 165 J/g, which was determined by the DSC measurement.

EXAMPLE 3

The main agent of a heat-storage material is TBAB. TBAB in an amount of 31 wt %, sodium carbonate serving as a pH adjuster in an amount of 1.9 wt %, and disodium hydrogen phosphate heptahydrate serving as a nucleating agent in an amount of 2.9 wt % were mixed with each other to produce an aqueous solution, which served as the heat-storage material.

EXAMPLE 4

The main agent of a heat-storage material is TBAB. TBAB in an amount of 31 wt %, sodium carbonate serving as a pH adjuster in an amount of 1.9 wt %, and disodium hydrogen phosphate dihydrate serving as a nucleating agent in an amount of 2.9 wt % were mixed with each other to produce an aqueous solution, which served as the heat-storage material.

EXAMPLE 5

The main agent of a heat-storage material is TBAB. TBAB in an amount of 31 wt %, sodium carbonate serving as a pH adjuster in an amount of 1.9 wt %, and disodium hydrogen phosphate anhydrate serving as a nucleating agent in an amount of 2.9 wt % were mixed with each other to produce an aqueous solution, which served as the heat-storage material.

EXAMPLE 6

The main agent of a heat-storage material is TBAB. TBAB in an amount of 31 wt %, sodium carbonate serving as a pH adjuster in an amount of 1.0 wt %, and disodium hydrogen phosphate dodecahydrate serving as a nucleating agent in an amount of 1.5 wt % were mixed with each other to produce an aqueous solution, which served as the heat-storage material. The heat-storage-material aqueous solution has a pH of 10.4, a melting starting temperature of 6.4° C., which was determined by the DSC measurement, and an amount of latent heat of 162 J/g, which was determined by the DSC measurement.

EXAMPLE 7

The main agent of a heat-storage material is TBAB. TBAB in an amount of 31 wt %, sodium carbonate serving as a pH adjuster in an amount of 1.0 wt %, and disodium hydrogen phosphate dodecahydrate serving as a nucleating agent in an amount of 2.9 wt % were mixed with each other to produce an aqueous solution, which served as the heat-storage material. The heat-storage-material aqueous solution has a pH of 10.3, a melting starting temperature of 6.8° C., which was obtained by the DSC measurement, and an amount of latent heat of 165 J/g, which was obtained by the DSC measurement.

EXAMPLE 8

The main agent of a heat-storage material is TBAB. TBAB in an amount of 33 wt %, sodium carbonate serving as a pH adjuster in an amount of 1.4 wt %, and disodium hydrogen phosphate dodecahydrate serving as a nucleating agent in an amount of 2.9 wt % were mixed with each other to produce an aqueous solution, which served as the heat-storage material. The heat-storage-material aqueous solution has a pH of 10.1, a melting starting temperature of 6.3° C., which was determined by the DSC measurement, and an amount of latent heat of 174 J/g, which was determined by the DSC measurement.

EXAMPLE 9

The main agent of a heat-storage material is TBAB. TBAB in an amount of 29 wt %, sodium carbonate serving as a pH adjuster in an amount of 1.9 wt %, and disodium hydrogen phosphate dodecahydrate serving as a nucleating agent in an amount of 2.9 wt % were mixed with each other to produce an aqueous solution, which served as the heat-storage material. The heat-storage-material aqueous solution has a pH of 10.1, a melting starting temperature of 7.0° C., which was determined by the DSC measurement, and an amount of latent heat of 166 J/g, which was determined by the DSC measurement.

EXAMPLE 10

The main agent of a heat-storage material is TBAB. TBAB in an amount of 33 wt %, sodium carbonate serving as a pH adjuster in an amount of 2.4 wt %, and disodium hydrogen phosphate dodecahydrate serving as a nucleating agent in an amount of 1.0 wt % were mixed with each other to produce an aqueous solution, which served as the heat-storage material. The heat-storage-material aqueous solution has a pH of 10.7, a melting starting temperature of 6.9° C., which was determined by the DSC measurement, and an amount of latent heat of 170 J/g, which was determined by the DSC measurement.

EXAMPLE 11

The main agent of a heat-storage material is TBAB. TBAB in an amount of 29 wt %, sodium carbonate serving as a pH adjuster in an amount of 0.1 wt %, and disodium hydrogen phosphate dodecahydrate serving as a nucleating agent in an amount of 2.0 wt % were mixed with each other to produce an aqueous solution, which served as the heat-storage material.

COMPARATIVE EXAMPLE 1

The main agent of a heat-storage material is TBAB. An aqueous solution including TBAB in an amount of 32 wt % was produced, which served as the heat-storage material of Comparative Example. The aqueous solution of this Comparative Example has a pH of 4.2.

COMPARATIVE EXAMPLE 2

The main agent of a heat-storage material is TBAB. TBAB in an amount of 31 wt % and disodium hydrogen phosphate dodecahydrate serving as a nucleating agent in an amount of 2.9 wt % were mixed with each other to produce an aqueous solution, which served as the heat-storage material of Comparative Example. The aqueous solution of this Comparative Example has a pH of 8.4.

COMPARATIVE EXAMPLE 3

The main agent of a heat-storage material is TBAB. TBAB in an amount of 31 wt % and sodium carbonate serving as a pH adjuster in an amount of 2 wt % were mixed with each other to produce an aqueous solution, which served as the heat-storage material in Comparative Example. The aqueous solution of this Comparative Example has a pH of 10.6.

COMPARATIVE EXAMPLE 4

The main agent of a heat-storage material is TBAB. TBAB in an amount of 31 wt % and sodium tetraborate pentahydrate serving as an additive in an amount of 2 wt % were mixed with each other to produce an aqueous solution, which served as the heat-storage material of Comparative Example. The aqueous solution of this Comparative Example has a pH of 9.5.

COMPARATIVE EXAMPLE 5

The main agent of a heat-storage material is TBAB. TBAB in an amount of 32 wt %, sodium hydroxide serving as a comparative pH adjuster in an amount of 0.5 wt %, and disodium hydrogen phosphate dodecahydrate serving as a nucleating agent in an amount of 2.9 wt % were mixed with each other to produce an aqueous solution, which served as the heat-storage material of Comparative Example. The aqueous solution of this Comparative Example has a pH of 10.8.

COMPARATIVE EXAMPLE 6

The main agent of a heat-storage material is TBAB. TBAB in an amount of 32 wt %, potassium carbonate serving as a comparative pH adjuster in an amount of 1.9 wt %, and disodium hydrogen phosphate dodecahydrate serving as a nucleating agent in an amount of 2.9 wt % were mixed with each other to produce an aqueous solution, which served as the heat-storage material of Comparative Example. The aqueous solution of this Comparative Example has a pH of 10.8.
(Presence or Absence of Supercooling Preventing Agent)

Example 1 is a sample in which 31 wt % of TBAB, 1.9 wt % of sodium carbonate, and 2.9 wt % of disodium hydrogen phosphate dodecahydrate were mixed with each other. Comparative Example 1 is a sample including only 32 wt % of TBAB serving as the main agent, and a supercooling preventing agent is not added thereto. Comparative Example 2 is a sample in which disodium hydrogen phosphate dodecahydrate is added to Comparative Example 1. Comparative Example 3 is a sample in which sodium carbonate is added to Comparative Example 1. When Example 1 and Comparative Examples 1 to 3 were placed in a Peltier cooler and maintained stably at 3° C. in the same manner (at a stable temperature of 3° C.), Example 1 froze, whereas Comparative Examples 1 to 3 did not freeze.
(Stability of Freezing)

Each sample of Example 1 and Comparative Examples 1 to 3 was placed in a 50-ml wide-mouthed bottle made of resin. The samples in the wide-mouthed bottles were placed in a Peltier constant-temperature chamber. The temperature was set to 3° C., and the samples were frozen over 18 hours. After freezing, the power was turned off for 18 hours to melt the samples. This cycle of freezing and melting was repeated for ten times to confirm the stability of the samples. The inventors have confirmed in experiments that whether a sample is frozen in all ten repeated tests or not is an effective indicator of freezing stability of the sample.

As a result, the sample of Example 1 was frozen for ten out of ten times. The sample of Comparative Example 1 including only a main agent and the sample of Comparative Example 3, to which a nucleating agent was not added, were never frozen at a stable temperature of 3° C. The sample of Comparative Example 2, to which a pH adjuster was not added, was frozen for five out of ten times, but was not frozen for five times, which showed an unstable result.

It has been confirmed that addition of both of a nucleating agent (disodium hydrogen phosphate dodecahydrate) and a pH adjuster (sodium carbonate) as supercooling preventing agents is needed to give an effect, and addition of only one of them does not result in stable freezing of the sample.
(Nucleating Agent)

Crystals of the sample of Example 1 deposited as primary crystals in freezing were filtrated, taken out, and subjected to powder XRD experiment. For comparison, the XRD experiment was also performed on possible reagents.

Figure 2:
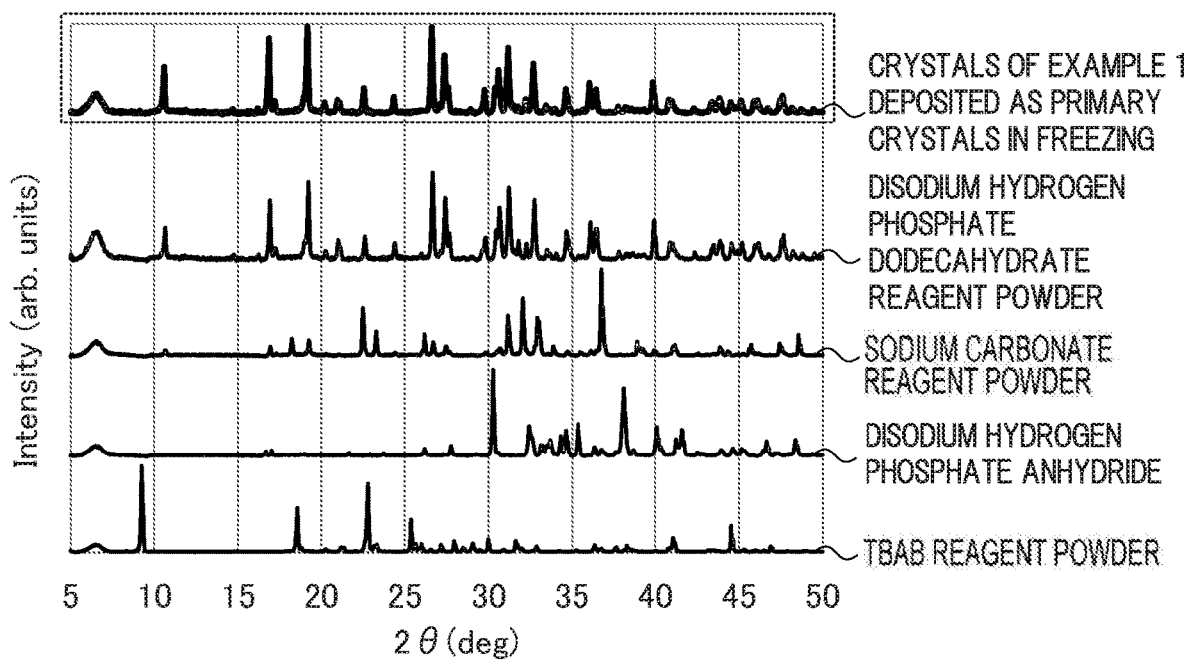
FIG. 2 is a graph showing an XRD-experiment result of deposits of samples.

FIG. 2 is a graph showing an XRD-experiment result of deposits of samples. As shown in FIG. 2, XRD profiles of the precipitates accorded with the XRD profiles of disodium hydrogen phosphate dodecahydrate. Therefore, it has been confirmed that the main component of crystals deposited as primary crystals is disodium hydrogen phosphate dodecahydrate and that nuclei that suppress supercooling of the heat-storage material are generated from disodium hydrogen phosphate dodecahydrate.
(Amount of Nucleating Agent)

In Example 1, the concentration of disodium hydrogen phosphate dodecahydrate added was set to 2.9 wt %, and in Example 2, the concentration was set to 1.4 wt %, which corresponds to the half of that in Example 1. As a result, a melting starting temperature and an amount of latent heat similar to those in Example 1 were obtained in Example 2.
(Types of Nucleating Agents)

There are several hydrates of disodium hydrogen phosphate serving as nucleating agents, such as anhydride, dihydride, heptahydride, and dodecahydride, which are different in terms of hydration number. In general, when a sodium hydroxide solution is added to a disodium hydrogen phosphate equivalent to the sodium hydroxide solution and the mixed solution is concentrated at pH 8.9 to 9.0, dodecahydrate is obtained at 35° C. or lower, a monoclinic heptahydrate is obtained at 35.4° C. to 48.35° C., an orthorhombic dihydrate is obtained at 48.35° C. to 95° C., and an anhydride is obtained at 95° C. or higher. In addition to the dodecahydrate of Example 1, the anhydrate, the dihydrate, and the heptahydrate of Examples 3 to 5 were prepared. Freezing and inching experiments were performed by using these different hydrates as nucleating agents. As a result, each sample of the Examples was frozen in a Peltier constant-temperature chamber at 3° C. It has been found that the hydration number does not affect a function of a nucleating agent.
(Increase in Freezing Temperature)

The above experiments were performed at a stable temperature of 3° C. Similar experiments were also performed in a Peltier constant-temperature chamber at 5° C. The sample of Example 1 (TBAB 31 wt %+disodium hydrogen phosphate dodecahydrate 1.9 wt %+sodium carbonate 2.9 wt %) and the sample of Comparative Example 4 (TBAB 31 wt %+sodium tetraborate pentahydrate 2.0 wt %) were used. As a result, it was confirmed that the sample of Example 1 was in a frozen state, in other words, the sample had no excess water and was thus firmly frozen. Specifically, it was confirmed that the sample was hard by pushing the sample with a spatula and seeing that the solid was not crumbled and that the spatula was not inserted into the solid. On the other hand, the sample of Comparative Example 4 had excess water as a supernatant, and when the sample was pushed with a spatula, the solid was crumbled, and the spatula was inserted into the solid. In other words, it was confirmed that the sample was not in a frozen state in the definition in the present application.

As described above, the heat-storage material according to one aspect of the present invention freezes completely at 5° C., thereby achieving an increase in the freezing temperature. Therefore, latent heat can be used at a relatively high temperature, thereby contributing to refrigeration in a district where the power condition is poor.
(pH Adjuster (Sodium Hydroxide))

In PTL 1 (Japanese Unexamined Patent Application Publication No. 2008-214527), a heat-storage material in which 3 wt % of disodium hydrogen phosphate dodecahydrate and 0.1 wt % of sodium hydroxide were added to 16 wt % of TBAB in a slurry state (16 wt % of TBAB, 2.9 wt % of disodium hydrogen phosphate dodecahydrate, and 0.1 wt % of sodium, hydroxide relative to 100 wt % of the total) was studied.

Figure 3:
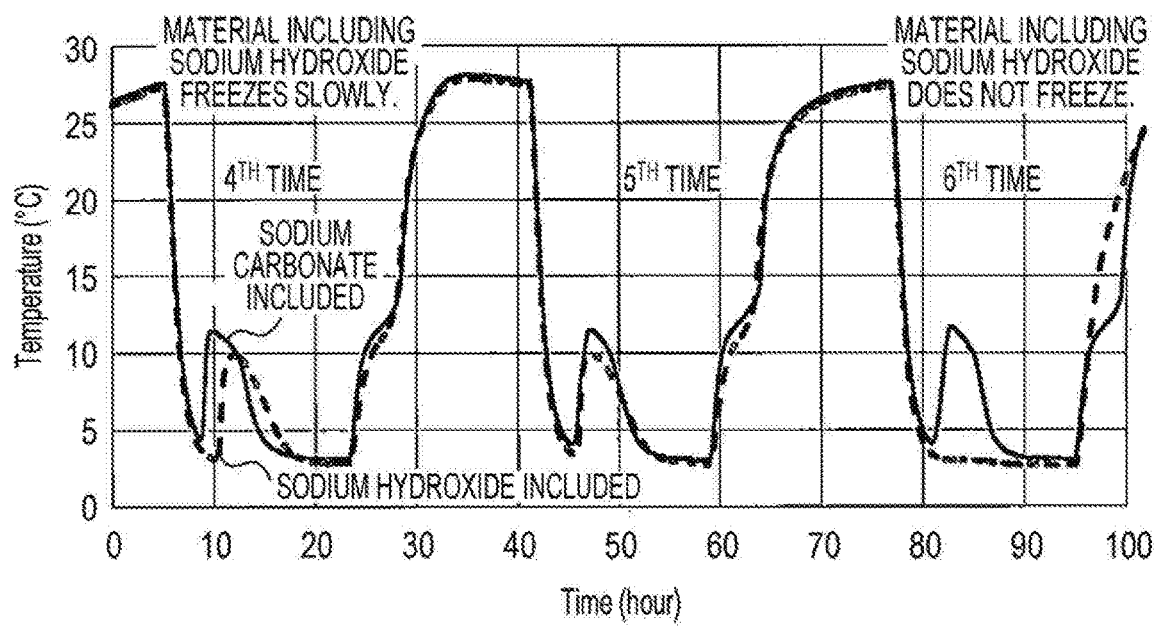
FIG. 3 is a graph showing a temperature history of each type of pH adjuster when freezing and melting is repeated.

From the foregoing, as Comparative Example 5, whether sodium hydroxide can be used instead of sodium carbonate or not was studied. Specifically, Comparative Example 5 to which 0.5 wt % of sodium hydroxide was added instead of 1.9 wt % of sodium carbonate in the composition of Example 1 was cooled at a stable temperature of 3° C. As a result, Comparative Example 5 was frozen six out of seven times, whereas Example 1 was frozen seven out of seven times. FIG. 3 is a graph showing a temperature history of each type of pH adjuster when freezing and melting was repeated. As shown in FIG. 3, when sodium hydroxide is used, freezing occurs unstably. Thus, sodium hydroxide is not suitable as a pH adjuster.
(pH Adjuster (potassium Carbonate and Potassium Hydrogen Carbonate))

Figure 4:
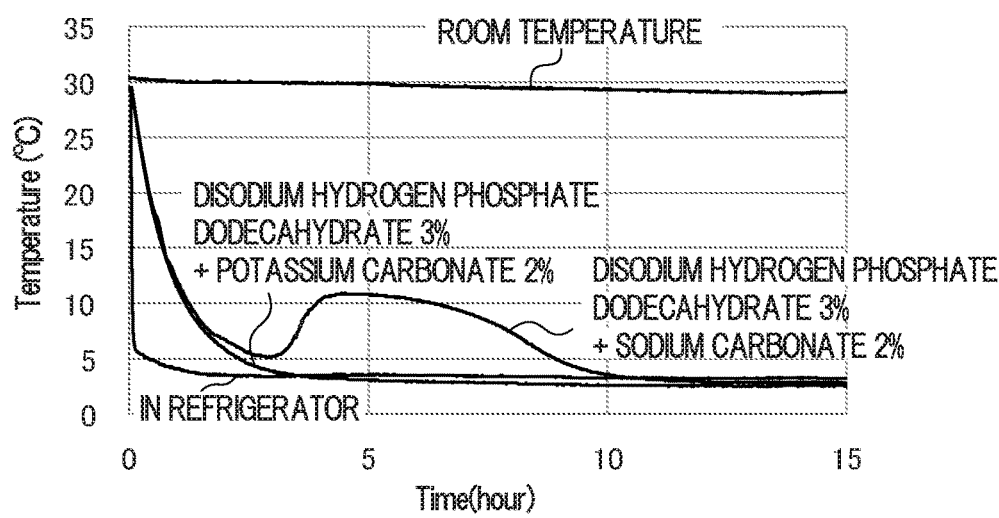
FIG. 4 is a graph showing temperature history of each type of pH adjuster in a refrigerator.

A sample in which potassium carbonate was used instead of sodium carbonate and a sample in which potassium hydrogen carbonate was used instead of sodium carbonate were subjected to the experiment under the same condition. Both samples were not frozen. FIG. 4 is a graph showing a temperature history of each type of pH adjuster in a refrigerator. For example, Comparative Example 6 to which 1.9 wt % of potassium carbonate was added instead of 1.9 wt % of sodium carbonate in the composition of Example 1 was cooled at a stable temperature of 3° C. but was not frozen. It is assumed that this is because the cation exhibits negative hydration in Comparative Example 6.
(Amount of pH Adjuster)

The heat-storage material of Example 11 was placed in a 50-ml wide-mouthed bottle made of resin. The heat-storage material in the wide-mouthed bottle was placed in a Peltier constant-temperature chamber, and the temperature was set to 5° C. After 18 hours, it was confirmed that the heat-storage material was in a frozen state. It has been found that when a nucleating agent is present in an amount of at least 2 wt %, a minimum amount of sodium carbonate is needed to be added as a pH adjuster.
(Comparison of Freezing Conditions)

The heat-storage materials of Example 6 and Example 7 were each placed in a 50-ml wide-mouthed bottle made of resin. The samples in the wide-mouthed bottles were placed on the middle shelf in the refrigerating room, which was a lower part of a two-door top-freezer refrigerator. Cooling conditions of the freezer (freezing room) and the refrigerating room were both set to the middle level, and the samples were left to stand for 18 hours. The temperature of the refrigerating room was repeatedly changed at intervals in the range of about 2° C. to 6° C. After 18 hours, it was confirmed that the heat-storage materials were in a frozen state in the wide-mouthed bottles. After freezing, the power was turned off for 18 hours to melt the samples. This cycle of freezing and melting was repeated for ten times to confirm the stability of the samples.
(Comparison of Concentrations)

Concentrations of TBAB, disodium hydrogen phosphate dodecahydrate, and sodium carbonate were changed, and whether samples were frozen or not in a cooling box at 5° C. was verified.

Examples 8 to 10 were completely frozen when stored for 18 hours in a cooling box at 5° C. in Examples 8 and 10, the concentration of TBAB is the same as the congruent melting point concentration or higher. In this case, the disodium hydrogen phosphate is required to only have a concentration of 1.0 wt % or higher. On the other hand, in Example 9, the concentration of TBAB is the same as the congruent melting point concentration or lower. In this case, the concentration of the disodium hydrogen phosphate, which leads to generation of nuclei, needs to be increased to 2.9 wt % or higher. With increasing contents of a pH adjuster and a nucleating agent, the amount of the main agent decreases relatively, thereby decreasing the amount of latent heat obtained. From the viewpoint of ensuring the sufficient amount of latent heat, the total content of the two substances is not over 10 wt % and preferably 6 wt % or less in practical applications.

Second Embodiment

Figure 5:
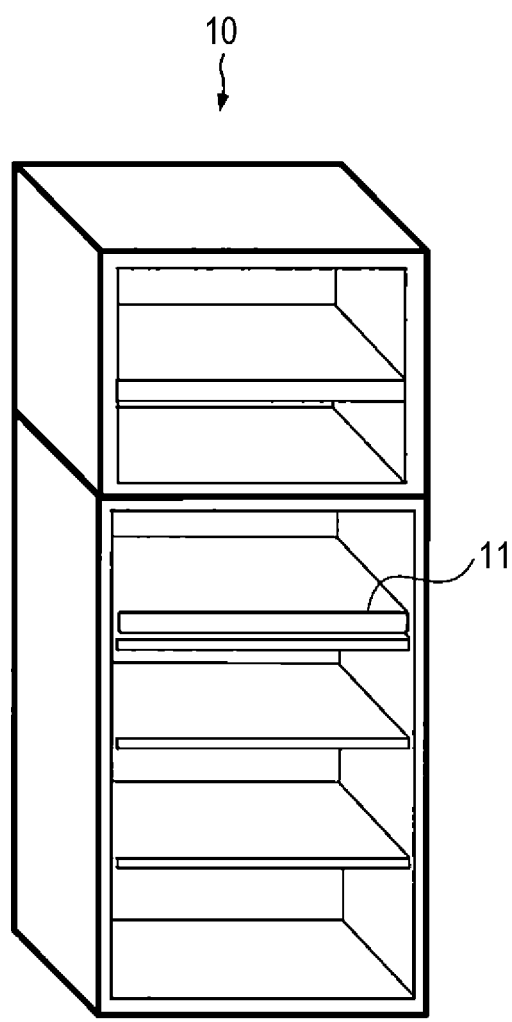
FIG. 5 is a perspective view of a refrigerator according to a second embodiment.

The above heat-storage material may be used as a member of a refrigerator. FIG. 5 is a perspective view of a refrigerator 10 including a heat-storage material. In FIG. 5, the door is omitted. The refrigerator 10 includes a heat-storage pack 11 on a wall in the refrigerator 10, the heat-storage pack 11 being formed of a heat-storage material and a packaging material covering the heat-storage material. This maintains a cool temperature for a long time, for example, even when energy supply to the refrigerator 10 is stopped.

The refrigerator 10 was practically formed in which the heat-storage pack 11 including the heat-storage material of Example 1 was disposed. The heat-storage pack 11 was disposed on an upper shelf of the refrigerator 10, which is a two-door top-freezer refrigerator, and a heat-storage material area was provided. Two 400-g PE containers (thickness 15 mm) were disposed adjacent to each other as heat-storage packs 11. The temperature of the refrigerating room was retained in the range of about 2° C. to 6° C. while the electricity was being supplied. The heat-storage material of Example 1 turned into a frozen state in 16 hours after disposed in the refrigerating room.

A cake with fresh cream containing animal fat was placed on the heat-storage pack 11. The power was shut off, and the refrigerator was temporarily put in a power outage state. Even after 6 hours from the power shut-off, the fresh cream retained the shape thereof and remained fresh. The room temperature out of the refrigerator 10 was about 30° C. On the other hand, when a cake with fresh cream was placed in a refrigerator that does not carry the heat-storage material and the power was shut off in the same manner, the fresh cream was softened and did not retain the shape thereof after 6 hours. It has been found that the refrigerator 10 carrying the heat-storage material is suitable as a refrigerator that can cope with a power outage. The heat-storage pack 11 has stable heat-storage properties even after freezing and melting is repeated for 500 times.

In the above example, the heat-storage pack 11 was disposed only on the upper shelf of the refrigerator 10; however, the heat-storage materials may be disposed on all shelves. For example, if there are four shelves, the heat-storage material may be disposed on each shelf, and each area may be cooled. In the present example, a PE container produced by blow molding was used as a packaging material; however, the container may be any container made of, for example, PP, stainless steel, aluminum, or a polymer film (in a long-term use, preferably a polymer film forming a steam barrier film). When the amount of the heat-storage material is increased, the period of cooling can be further increased.

Third Embodiment

Figure 6:
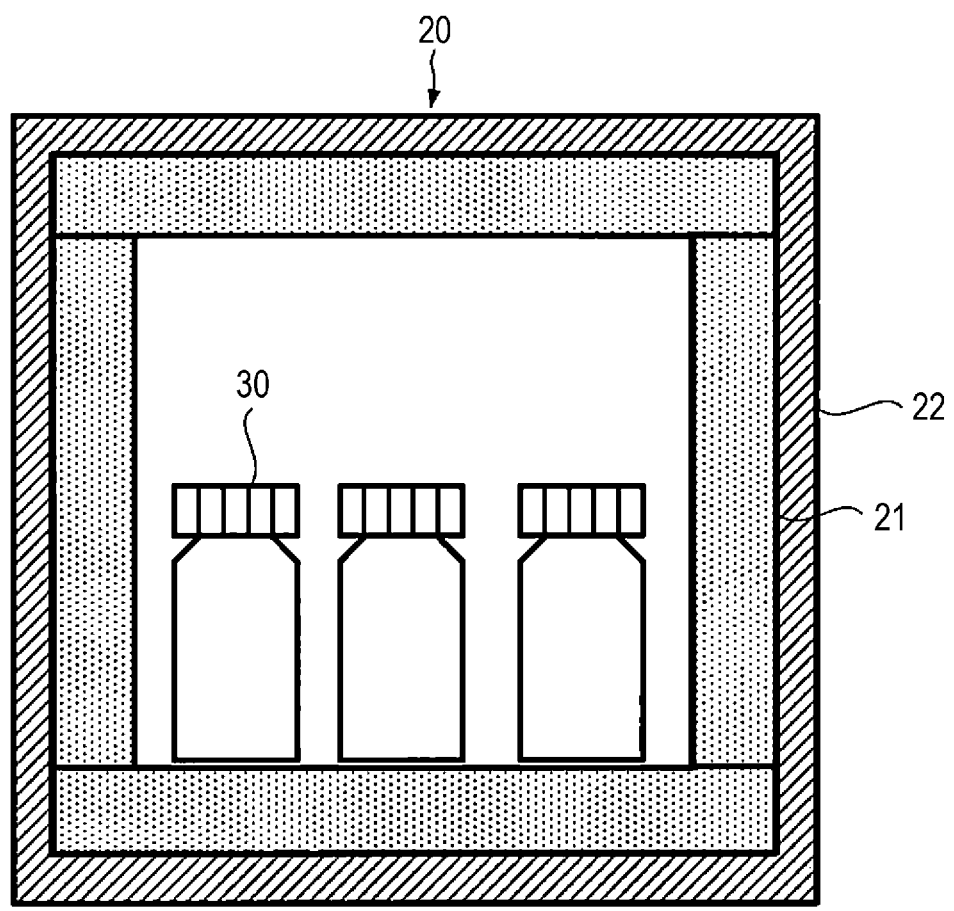
FIG. 6 is a sectional view of a cooling container according to a third embodiment.

The above heat-storage material can be used in the structure of a cooling container. FIG. 6 is a sectional view of a cooling container 20. The cooling container 20 includes a heat-storage pack 21 and a container body 22 accommodating the heat-storage pack 21. The heat-storage pack 21 is formed of a heat-storage material and a packaging material covering the heat-storage material and disposed at a position where the heat-storage pack 21 can exchange heat with objects to be cooled. The container body 22 accommodates objects to be cooled and the heat-storage pack 21 and keeps the objects cool with the heat-storage pack 21. This enables transference of an object 30 accommodated in the container body while maintaining the inside of the container body at a refrigerated temperature. The heat-storage material according to one aspect of the present invention freezes at 5° C. and can be thus used in a cooling-box for refrigerated goods in emerging countries and is effective for decreasing power consumption during cooling. Furthermore, the function is not decreased even after freezing and melting is repeated 500 times.

The heat-storage material of Example 1 was practically provided in heat-storage pack 2I, the heat-storage pack 21 was placed to cover the inside of the cooling container 20, and milk beverages were placed as objects 30 to be transferred. When the cooling container 20 was placed in a refrigerator, the heat-storage material was frozen, and the milk beverages were maintained cool in a refrigerated temperature range. It is possible to transfer the milk beverages in this state. An increase in the freezing temperature enables suppression of energy consumption in cooling a cooling box; thus, the cooling container 20 can be used in transport business in developing countries where the power condition is poor.

Fourth Embodiment

The above heat-storage material may be used as a cold-storage pack used for cooking. For proving this, the following heat-storage material was produced.

EXAMPLE 12

An aqueous solution was produced as a heat-storage material in which TBAB serving as the main agent of the heat-storage material in an amount of 38 wt %, sodium carbonate serving as a pH adjuster in an amount of 1.9 wt %, and disodium hydrogen phosphate dodecahydrate serving as a nucleating agent in an amount of 2.9 wt % were mixed with each other. The aqueous solution serving as a heat-storage material has a melting starting temperature of 10.6° C., which was determined by the DSC measurement, and an amount of latent heat of 160 J/g, which was determined by the DSC measurement.

COMPARATIVE EXAMPLE 7

As Comparative Example, an aqueous solution including only TBAB serving as the main agent of a heat-storage material in an amount of 40 wt % was produced as a heat-storage material.

The heat-storage material of Example 12 may be used to prepare "room-temperature butter" and used for a frozen-food melting pack. The term "room-temperature butter" refers to softened butter that is in a state in which an impression remains after pressing the butter slightly with a finger and that is prepared by increasing the temperature of the butter, which has a temperature in the range of 0° C. to 5° C. after taken out from a refrigerator, to about 15°. Controlling the temperature of butter is needed in baking butter cakes and cookies. In particular, it is said that using the butter in this state is essential for pie doughs and Danish doughs. The room temperature is typically around 20° C., and thus, if butter taken out from a refrigerator is maintained at room temperature, the butter becomes "softened butter for a compound butter", which is more softened than "room-temperature butter". To prevent this state change and to prepare "room-temperature butter" rapidly, a cold-storage pack was produced.

Figure 7:
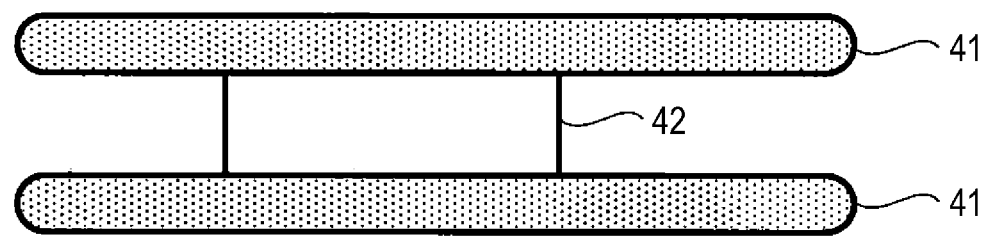
FIG. 7 is a sectional view of a cold-storage pack according to a fourth embodiment.

FIG. 7 is a sectional view of a cold-storage pack used for butter. A cold-storage pack 41 is formed by filling a A4-size film pack with the heat-storage material of Example 12. The heat-storage material retained at room temperature had a temperature almost the same as the room temperature (around 20° C.) and was in a liquid phase. When butter 42 taken out of a refrigerator was sandwiched by these cold-storage packs 41, the state of "room-temperature butter" was retained for a few minutes to about 60 minutes. The heat-storage material of Example 12 was in contact with the cooled butter 42, and the temperature of the heat-storage material was decreased. Then, the heat-storage material started to be solidified. In this case, the heat-storage material of Example 12 has a clathrate hydrate-generating temperature of 12° C., and thus, the temperature appropriate for keeping the cooled butter as "room-temperature butter" was maintained. On the other hand, the heat-storage material of Comparative Example 7 was not caused to start solidifying by contact with the cooled butter, and the temperature of the butter changed in the almost same manner as in a case where butter was left to stand at room temperature.

(Verification of Effect of Supercooling Suppressing Agent)

Crystal structure analysis simultaneous measurement of each heat-storage material of Example 12 and Comparative Example 7 was performed by using an X-ray diffraction and differential scanning calorimetry measurement apparatus (X-ray DSC) manufactured by Rigaku Corporation. The measurement was performed while the temperature was decreased 2° C. per minute from 25° C. to −35° C.

As a result, a crystal structure started to be detected at −4.4° C. in the heat-storage material of Example 12. In the heat-storage material of Comparative Example 7, a crystal structure started to be detected at −6.5° C. This showed that the temperature at which a crystal structure was detected in Example 12 was higher than that in Comparative Example 7, thereby verifying the effect of the supercooling suppressing agent. In this measurement, the temperature was decreased at 2° C. per minute, so that the resultant temperature is much lower than the actual temperature at which solidification (crystallization) starts; however, verification of the effect is possible by relatively comparing both temperatures.

In the same manner, the temperature at which a crystal structure started to be detected in each heat-storage material of Example 1, Example 2, and Comparative Example 1 was measured with an X-ray DSC. As a result, the temperature at which a crystal structure was detected was −3.4° C. in Example 1, −3.3° C. in Example; 2, and −6.9° C. in Comparative Example 1, thereby verifying the effect of the supercooling suppressing agent.

The present international application claims the priority based on Japanese Patent Application No. 2015-254694 filed on 25 Dec. 2015 and Japanese Patent Application No. 2016-144285 filed on 22 Jul. 2016, All the contents described in Japanese Patent Application No. 2015-254694 and Japanese Patent Application No. 2016-144285 are incorporated herein by reference.

REFERENCE SIGNS LIST 10 refrigerator
11 heat-storage pack
20 cooling container 21 heat-storage pack
22 container body
30 object
41 cold-storage pack
42 butter

The invention claimed is:

1. A heat-storage material that changes phase at a predetermined temperature, the heat-storage material comprising:
    water;
    a main agent including a quaternary ammonium salt that forms a semiclathrate hydrate;
    a pH adjuster that maintains alkaline properties; and
    a nucleating agent that generates a cation that exhibits positive hydration, the cation serving as a nucleus in crystallizing the semiclathrate hydrate, wherein
    the pH adjuster is sodium carbonates,
    the nucleating agent is an anhydride or hydrate of disodium hydrogen phosphate,
    the heat-storage material has a pH of 10 or more, and
    the heat-storage material is an aqueous solution at temperatures higher than the predetermined temperature.

2. The heat-storage material according to claim 1, wherein a content of the pH adjuster is 0.1 wt % or more, a content of the nucleating agent is 1.4 wt % or more, and a total content of the pH adjuster and the nucleating agent is 2.1 wt % or more and 10 wt % or less.

3. The heat-storage material according to claim 1, wherein a total content of the pH adjuster and the nucleating agent is 6 wt % or less.

4. A refrigerator comprising a heat-storage pack on a wall in the refrigerator, the heat-storage pack being formed of the heat-storage material according to claim 1 and a packaging material covering the heat-storage material.

5. A cooling container that cools an object, the cooling container comprising:
    a heat-storage pack that is formed of the heat-storage material according to claim 1 and a packaging material covering the heat-storage material and that is disposed at a position where the heat-storage pack can exchange heat with the object; and
    a container that accommodates the object and the heat-storage pack.

* * * * *